US012801795B2

(12) United States Patent
Caullery et al.

(10) Patent No.: US 12,801,795 B2
(45) Date of Patent: Nov. 17, 2026

(54) WINDOWED OUT-OF-ORDER EXECUTION IN PROCESSING UNITS AS A SIDE-CHANNEL ATTACK COUNTERMEASURE

(71) Applicant: QUALCOMM Incorporated, San Diego, CA (US)

(72) Inventors: Florian Reneld Ghislain Caullery, Cannes (FR); Frederic Amiel, Nice (FR); Fabrice Marinet, Chateauneuf-le-Rouge (FR)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 18/465,897

(22) Filed: Sep. 12, 2023

(65) Prior Publication Data

US 2025/0086328 A1 Mar. 13, 2025

(51) Int. Cl.
*G06F 21/75* (2013.01)

(52) U.S. Cl.
CPC .................................... *G06F 21/75* (2013.01)

(58) Field of Classification Search
CPC ........................................................ G06F 21/75
See application file for complete search history.

(56) References Cited

U.S. PATENT DOCUMENTS

| | | | | |
|---|---|---|---|---|
| 9,684,608 | B2 * | 6/2017 | McKeen | G06F 21/53 |
| 9,698,989 | B2 * | 7/2017 | Scarlata | G06F 21/12 |
| 9,703,715 | B2 * | 7/2017 | Goldsmith | G06F 12/084 |
| 9,734,329 | B2 * | 8/2017 | Boehm | G06F 12/0646 |
| 10,776,493 | B2 * | 9/2020 | Laffey | H04L 9/3236 |
| 11,403,107 | B2 * | 8/2022 | Wallach | G06F 21/71 |
| 11,487,517 | B2 * | 11/2022 | Sun | G06F 9/5044 |
| 11,537,715 | B2 * | 12/2022 | Porteboeuf | G06F 11/28 |
| 12,105,860 | B2 * | 10/2024 | Kaluzhny | G06F 21/75 |
| 12,223,064 | B2 * | 2/2025 | Kumar | G06F 21/54 |
| 12,301,614 | B1 * | 5/2025 | Payne | H04L 63/1491 |
| 2009/0010424 | A1 * | 1/2009 | Qi | H04L 9/005 717/106 |
| 2016/0188492 | A1 * | 6/2016 | Bachwani | G06F 12/14 711/6 |
| 2016/0285896 | A1 * | 9/2016 | Caprioli | G06F 21/556 |
| 2017/0091449 | A1 * | 3/2017 | Boehm | G06F 21/60 |

(Continued)

OTHER PUBLICATIONS

Bayrak A.G., et al., "An Architecture-Independent Instruction Shuffler to Protect against Side-Channel Attacks", ACM Transactions On Architecture and Code Optimization, vol. 8, No. 4, Jan. 1, 2012, 19 Pages, XP055110086, p. 20:1, line 6—p. 20_1, line 18 page 20:2, line 30—p. 20:4, line 2 page 20:7, line 1—p. 20:7, line 28 p. 20:9, line 17—p. 20:10, line 16 page 20:15, line 9—p. 20:18, line 3.

(Continued)

*Primary Examiner* — Viral S Lakhia
(74) *Attorney, Agent, or Firm* — Polsinelli LLP

(57) ABSTRACT

Systems and techniques are provided for secure processing. For instance, a process can include receiving a plurality of instructions for execution; receiving an indication that the plurality of instructions are independent instructions; randomly reordering the plurality of instructions; executing the randomly reordered plurality of instructions; and outputting a plurality of results corresponding to the plurality of instructions.

27 Claims, 7 Drawing Sheets

(56) References Cited

U.S. PATENT DOCUMENTS

| | | | | |
|---|---|---|---|---|
| 2017/0255416 | A1* | 9/2017 | Zhang | G06F 21/53 |
| 2018/0336342 | A1* | 11/2018 | Narendra Trivedi | G06F 21/57 |
| 2019/0213330 | A1* | 7/2019 | Shen-Orr | G06F 12/1441 |
| 2020/0410102 | A1* | 12/2020 | Miller | G06F 21/572 |
| 2021/0192045 | A1* | 6/2021 | Jiang | G06N 20/00 |
| 2023/0004644 | A1* | 1/2023 | Jeong | G06F 7/588 |
| 2024/0386101 | A1* | 11/2024 | Fredrickson | G06F 21/567 |
| 2025/0013735 | A1* | 1/2025 | Teglia | G06F 21/75 |

OTHER PUBLICATIONS

Dubey A., et al., "Guarding Machine Learning Hardware Against Physical Side-Channel Attacks", ACM Journal on Emerging Technologies in Computing Systems (JETC), ACM, 2 Penn Plaza, Suite 701 New York, 10121-0701, USA, vol. 18, No. 3, Apr. 28, 2022, 31 Pages, XP058744866, p. 56:15, paragraph 4.6—p. 56:17, line 6.

International Search Report and Written Opinion—PCT/US2024/045208—ISA/EPO—Nov. 19, 2024.

* cited by examiner

WINDOWED OUT-OF-ORDER EXECUTION IN PROCESSING UNITS AS A SIDE-CHANNEL ATTACK COUNTERMEASURE

FIELD

The present disclosure generally relates to secure computing. For example, aspects of the present disclosure relate to systems and techniques for enhancing security protections using windowed out-of-order execution in processing units as a side-channel attack countermeasure.

BACKGROUND

Computing devices can store sensitive data owned by users or enterprises, with firmware or operating system software on the computing devices. To help secure computing devices, the firmware or software may include security measures to protect against various security threats, e.g., brute force attacks, disabling secure boot/trust boot, and/or avoiding side channel attacks on the computing devices.

A side channel attack may be one class of attacks on computing devices which attempt to exploit some physical characteristic of the computing device to obtain information from the computing device. Characteristics that may be exploited may include timing, power consumption heat emissions, electromagnetic emissions, acoustic emissions, and the like. Consequently, techniques to help mitigate or detect possible side channel attacks may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for out-of-order execution in processing units as a side-channel attack countermeasure. In one illustrative example, an apparatus for secure processing is provided. The apparatus includes a memory comprising instructions and a processor coupled to the memory. The processor is configured to: receive a plurality of instructions for execution; receive an indication that the plurality of instructions are independent instructions; randomly reorder the plurality of instructions; execute the randomly reordered plurality of instructions; and output a plurality of results corresponding to the plurality of instructions.

As another example, a method for secure processing is provided. The method includes: receiving a plurality of instructions for execution; receiving an indication that the plurality of instructions are independent instructions; randomly reordering the plurality of instructions; executing the randomly reordered plurality of instructions; and outputting a plurality of results corresponding to the plurality of instructions.

In another example, an apparatus for secure processing is provided. The apparatus includes: means for receiving a plurality of instructions for execution; means for receiving an indication that the plurality of instructions are independent instructions; means for randomly reordering the plurality of instructions; means for executing the randomly reordered plurality of instructions; and means for outputting a plurality of results corresponding to the plurality of instructions.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware elements including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
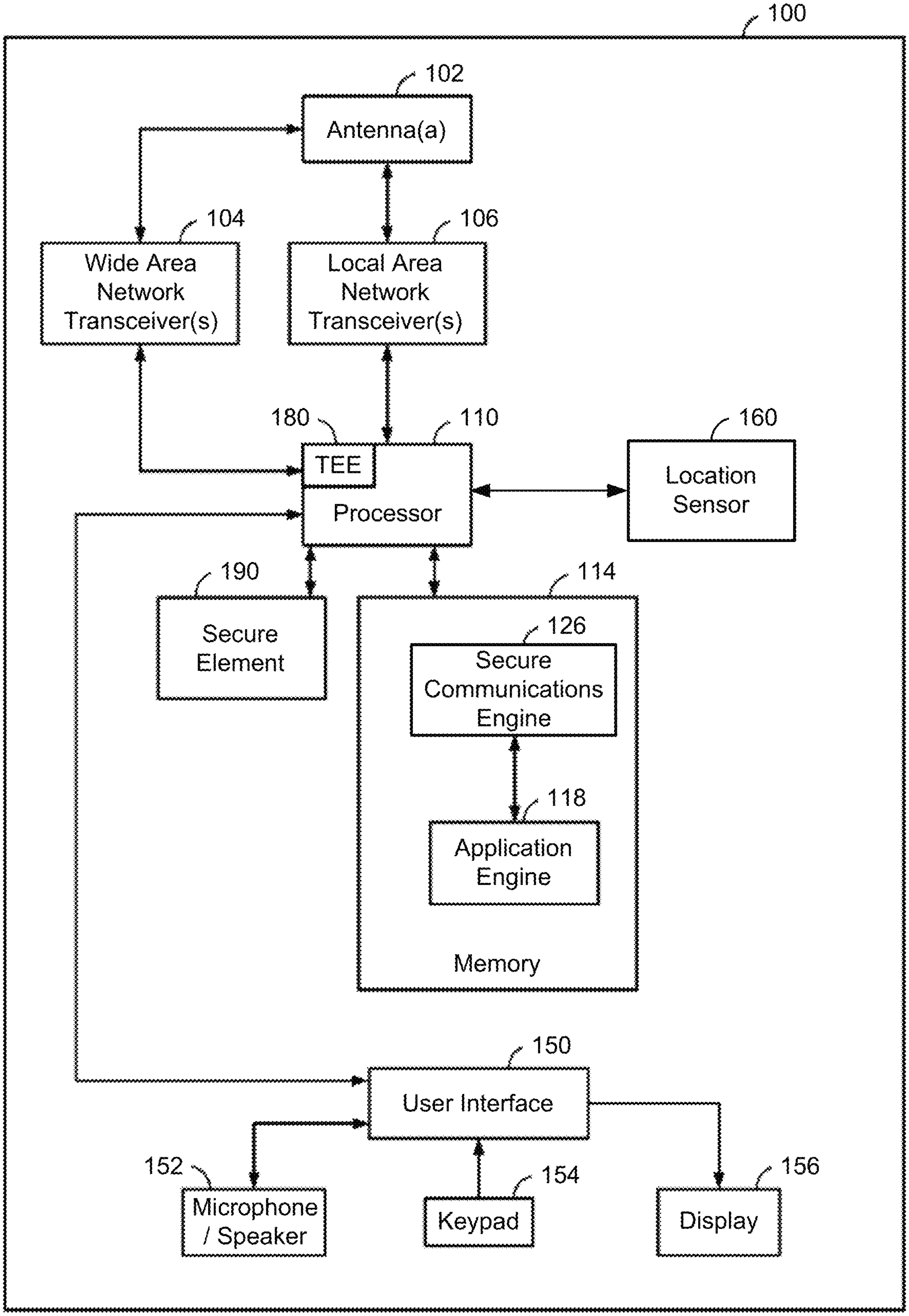
FIG. 1 is a diagram illustrating an example wireless device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a computing device may be capable of performing operations where extra security may be desirable. The computing device can be a wireless device (e.g., a user equipment (UE) in a 3rd Generation Partnership Project (3GPP) system, such as a 4G Long Term Evolution (LTE) network or 5G new radio (NR) network), a base station (e.g., an LTE eNodeB (NB), a 5G/NR gNodeB (gNB), etc.), a server device, or other computing device. Examples of wireless devices include a mobile device (e.g., a mobile phone), an extended reality (XR) device such as a virtual reality (VR) device or augmented reality (AR) device, a vehicle or component or system of a vehicle, an Internet of Things (IoT) device, a network-connected wearable such as a watch, or other type of computing device.

For example, the computing device may be used to generate private keys which can be used to secure important assets, such as blockchain wallets, digital certificates, digital signatures, and the like. The computing device may also be used to access such important assets. To help allow such security actions to be performed, the computing device may include a secure processing unit. The secure processing unit may be configured or designed (or "hardened") to resist attacks, such as side channel attacks, which may make the secure processing unit less suitable for general use.

Side-channel attacks are a class a physical attacks on a computing device where an attacker has access to the computing device and may perform non-destructive attempts to extract information from the computing device, for example, by measuring power consumption of the device when performing certain tasks, inducing errors, such as flipped bits or induced power glitching, and so forth to help find subtle physical differences that may occur when certain operations are performed. For example, an attacker may measure a device's power consumption or electromagnetic radiation during the execution of a cryptographic algorithm to extract cryptographic keys from the device.

To help harden processors against side-channel attacks, a processor may execute certain instructions in a random order. In some cases, these instructions may be independent machine code instructions (e.g., instructions which may be executed out of order) for executing a cryptographic operation. Executing instructions in a random order, or shuffling instructions, can help make it more difficult for an attacker to correlate data obtained via the side channel with what is being executed, which in turn can make developing side-channel attacks more difficult. While shuffling may be implemented in software, software implementations of shuffling may have variations in quality of implementation across software applications and can produce machine code/assembly with large jumps in the code, which may be identified using machine learning techniques by an attacker.

Systems, apparatuses, electronic devices, methods (also referred to as processes), and computer-readable media (collectively referred to herein as "systems and techniques") are described herein for using windowed out-of-order execution on processing units countering side-channel attacks. In some cases, a dedicated instruction (e.g., opcode, operation code, instruction code, assembly instruction, etc.) or flag (e.g., flag, a voltage applied to a pin, a bit set in a register, etc.) may be added to a processor to indicate presence of a plurality of instructions which may be executed in a random order. This dedicated instruction or flag may be used to trigger an out of order execution (e.g., speculative execution) pipeline of the processor. For example, based on this indication an execution order of the plurality of instructions which may be executed in a random order may be randomized and then the plurality of instructions executed in the random order. The randomized plurality of instructions may then be placed on a reordering buffer of the out of order execution pipeline and the randomized plurality of instructions executed. In some cases, the dedicated instruction may indicate a number of following instructions that may be executed in randomized order. In other cases, dedicated instructions may indicate a beginning and end for the plurality of instructions may be executed in randomized order. In other cases, the flag may indicate when the plurality of instructions may be executed in randomized order are received.

Additional aspects of the present disclosure are described in more detail below.

FIG. 1 is a diagram illustrating an example wireless device 100 that can be used to perform the techniques described herein. The wireless device 100 may include a client device such as a user equipment (UE) (e.g., the UE 504, the UE 552, or the UE 590 of FIG. 5 described below) or other type of device (e.g., a station (STA) configured to communication using a Wi-Fi interface) that may be used by an end-user. For example, the wireless device 100 may include a mobile phone, a vehicle or computing system or device of the vehicle, a router, a tablet computer, a laptop computer, a tracking device, a wearable device (e.g., a smart watch, glasses, etc.), an extended reality (XR) device (e.g., a virtual reality (VR), augmented reality (AR), or mixed reality (MR) device, etc.), an Internet of Things (IoT) device, a access point, a point of sale device, and/or another device that is configured to communicate over a wireless communications network.

As shown, the wireless device 100 may include one or more local area network transceivers 106 that may be connected to one or more antennas 102. The one or more local area network transceivers 106 comprise suitable devices, circuits, hardware, and/or software for communicating with and/or detecting signals to/from a network device (e.g., the access point (AP) 550 of FIG. 5), and/or directly with other wireless devices (e.g., the UE 552 of FIG. 5), within a network.

The wireless device 100 may also include, in some implementations, one or more wide area network transceiver(s) 104 that may be connected to the one or more antennas 102. The wide area network transceiver 104 may comprise suitable devices, circuits, hardware, and/or software for communicating with and/or detecting signals from one or more other devices or systems (e.g., the base station (BS) 502, AP 550, millimeter wave (mmW) base station (BS) 580 of FIG. 5) and/or directly with other wireless devices (e.g., UE 552 of FIG. 5) within a network. In some implementations, the wide area network transceiver(s) 104 may comprise a CDMA communication system suitable for communicating with a CDMA network of wireless base stations. In some implementations, the wireless communication system may comprise other types of cellular telephony networks, such as, for example, TDMA, GSM, WCDMA, LTE, NR, and the like. Additionally, any other type of wireless networking technologies may be used, including, for example, WiMax (802.16), Wi-Fi (802.11), and the like.

The processor(s) (also referred to as a controller) 110 may be connected to the local area network transceiver(s) 106 and the wide area network transceiver(s) 104. The processor 110 may include one or more microprocessors, microcontrollers, and/or digital signal processors that provide processing functions, as well as other calculation and control functionality. The processor 110 may be coupled to storage media (e.g., memory) 114 for storing data and software instructions for executing programmed functionality within the mobile device. The memory 114 may be on-board the processor 110 (e.g., within the same IC package), and/or the memory may be external memory to the processor and functionally coupled over a data bus.

In some cases, the processor 110 may be coupled to a location sensor 160. The location sensor 160 may provide information regarding a location of the wireless device 100. In some cases, the location sensor 160 may include a Global Navigation Satellite System (GNSS) receivers or transceivers that are used to determine a location of the wireless device 100. In some cases, the location sensor 160 may estimate a location of the wireless device 100, for example, based on wireless signals received from one or more wireless nodes, such as BS 502, AP 550, mmW BS 580 as shown in FIG. 5.

Figure 5:
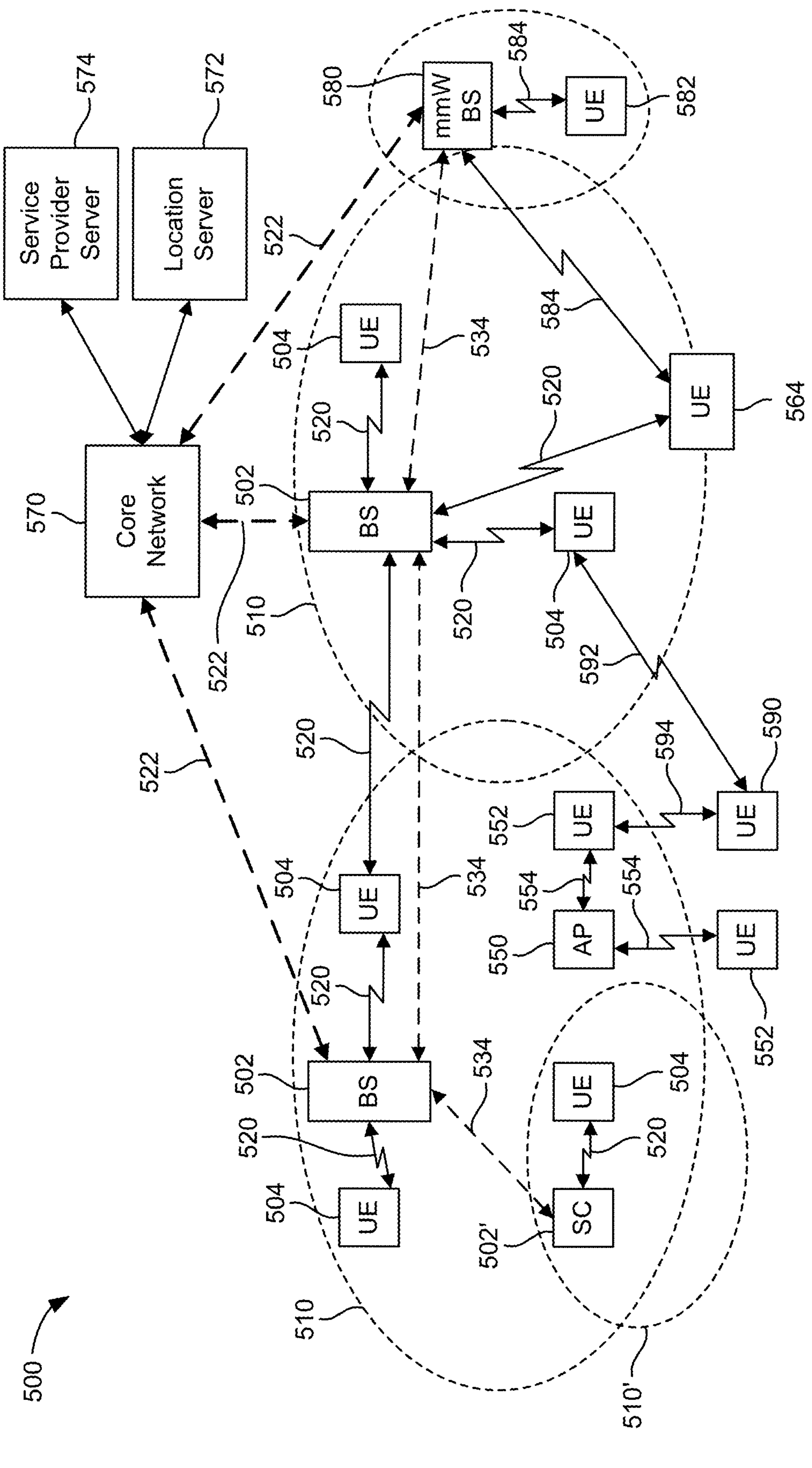
FIG. 5 is a block diagram illustrating an example of a wireless communication network, in accordance with some examples.

A number of software engines and data tables may reside in memory 114 and may be utilized by the processor 110 in order to manage both communications with remote devices/nodes (such as the BS 502, AP 550, mmW BS 580 as shown in FIG. 5), perform positioning determination functionality, and/or perform device control functionality. In some embodiments, the memory 114 may include an application engine 118 and a secure communications engine 126. It is to be noted that the functionality of the modules and/or data structures may be combined, separated, and/or be structured in different ways depending upon the implementation of the wireless device 100.

The application engine 118 may include a process running on the processor 110 of the wireless device 100, which may request data from one of the other modules of the wireless device 100. Applications typically run within an upper layer of the software architectures and may be implemented in a rich execution environment of the wireless device 100, and may include indoor navigation applications, shopping applications, financial services applications, social media applications, location aware service applications, etc. The applications of the application engine 118 may make use of access tokens to obtain content from a remote server, such as a service provider server 574 of FIG. 5.

The secure communications engine 126 may be a process configured to manage the storage of and access to the access tokens, encryption keys, attestation information, and the like. The secure communications engine 126 may be executed on a processor component of the trusted execution environment 180 and/or the secure element 190, where the wireless device 100 includes such components. The functionality of the secure communications engine 126 discussed herein can also be implemented as hardware or a combination of hardware and software. The secure communications engine 126 can be implemented one or more application specific integrated circuits (ASICs), programmable logic devices (PLDs), field programmable gate arrays (FPGAs), or other electronic units designed to perform the functions described herein, or a combination thereof.

The wireless device 100 may further include a user interface 150 providing suitable interface systems, such as a microphone/speaker 152, a keypad 154, and a display 156 that allows user interaction with the wireless device 100. The microphone/speaker 152 provides for voice communication services (e.g., using the wide area network transceiver(s) 104 and/or the local area network transceiver(s) 106). The keypad 154 may comprise suitable buttons for user input. The display 156 may include a suitable display, such as, for example, a backlit LCD display, and may further include a touch screen display for additional user input modes.

The processor 110 may also include a trusted execution environment 180. The trusted execution environment 180 can be implemented as a secure area of the processor 110 that can be used to process and store sensitive data in an environment that is segregated from the rich execution environment in which the operating system and/or applications (such as those of the application engine 118) may be executed. The trusted execution environment 180 can be configured to execute trusted applications that provide end-to-end security for sensitive data by enforcing confidentiality, integrity, and protection of the sensitive data stored therein. The trusted execution environment 180 can be used to store encryption keys, access tokens, and other sensitive data.

The wireless device 100 may include a secure element 190 (also referred to herein as a trusted component). The wireless device 100 may include the secure element 190 in addition to or instead of the trusted execution environment 180. The secure element 190 can comprise autonomous and tamper-resistant hardware that can be used to execute secure applications and the confidential data associated with such applications. The secure element 190 can be used to store encryption keys, access tokens, and other sensitive data. The secure element 190 can comprise a Near Field Communication (NFC) tag, a Subscriber Identity Module (SIM) card, or other type of hardware device that can be used to securely store data. The secure element 190 can be integrated with the hardware of the wireless device 100 in a permanent or semi-permanent fashion or may, in some implementations, be a removable or external component of the wireless device 100 that can be used to securely store data and/or provide a secure execution environment for applications.

In some cases, to help reduce an attack surface against side-channel attacks, some secure applications may execute in a secure processing unit, such as the trusted execution environment 180 and/or secure element 190, without knowledge of other components in their operating environment, such as the wide/local area networks, sensors, such as the location sensor 160, and/or certain elements of the user interface, such as the microphone/speaker 152. In some cases, certain elements, such as the keypad 154 and/or display 156, may be needed by a secure application, for example, to provide a password to use a key to encrypt/decrypt data.

To help harden a processor, such as the secure element 190, trusted execution environment 180, processor 110, etc., independent instructions for execution on the processor may be executed in a random order (e.g., shuffling). By executing independent instructions in a random order, an attacker may not be able to determine what instruction is being executed at a given time, which may make it harder for the attacker to correlate data obtained via the side channel and what is being executed. Of note, not all instructions may be executed out-of-order by a processor. Instructions which depend on each other (e.g., one instruction uses output written by another instruction) may not be executed out-of-order. However, instructions which do not depend on each other (e.g., are independent) such that modifying the order of execution does not modify the result may be executed out-of-order. For example, a first instruction to multiply contents of a register A and register B and output to register C may be independent of a second instruction to add contents of register D and register E and output to register F. However, a first instruction to multiply contents of a register A and register B and output to register C is not independent from a second instruction to add the contents of register C and register E and output to register F as the second instructions uses a result of the first instruction. Of note, the term random, as used herein, should be interpreted to encompass a truly random number (e.g., based on a physical process which is known to have statistically random noise (e.g., entropy)) and pseudo random numbers.

Traditionally, shuffling independent instructions into a random order may be software implemented. However, such implementations may be slower and/or subject to a higher likelihood of implementation error or variations in quality of implementation across software applications. For example, the assembly code produced using such shuffling techniques may include multiple jumps in the assembly and these jumps may be identified using machine learning techniques by an attacker. Instead, it may be useful to have a hardware implementation for triggering instruction shuffling, such as a dedicated instruction (e.g., an instruction specifically for triggering instruction shuffling), setting, mode. Such a hardware implementation for instruction shuffling may be especially useful in hardware that is intended to be hardened against attacks, such as the secure element 190, trusted execution environment 180, etc.

In some cases, a dedicated instruction (e.g., opcode, operation code, instruction code, assembly instruction, etc.) or flag may be added to the processor to indicate presence of independent instructions which may be executed in a random order. This dedicated instruction or flag may be used to trigger an out of order execution (e.g., speculative execution) pipeline of the processor. For example, a processor may include a speculative execution pipeline including a reorder buffer. In typical use, the processor may execute a branch of instructions out of order (e.g., speculatively) and ahead of non-speculative instructions that are being executed on the main branch. The results of the executed instruction in the speculative branch may then be stored, along with the instruction, in the reorder buffer. Instructions executing in the main branch may then be compared to instructions executed in the speculative branch and if the instructions match, then the results of the instructions can be used without re-executing the instructions in the main branch.

Figure 2:
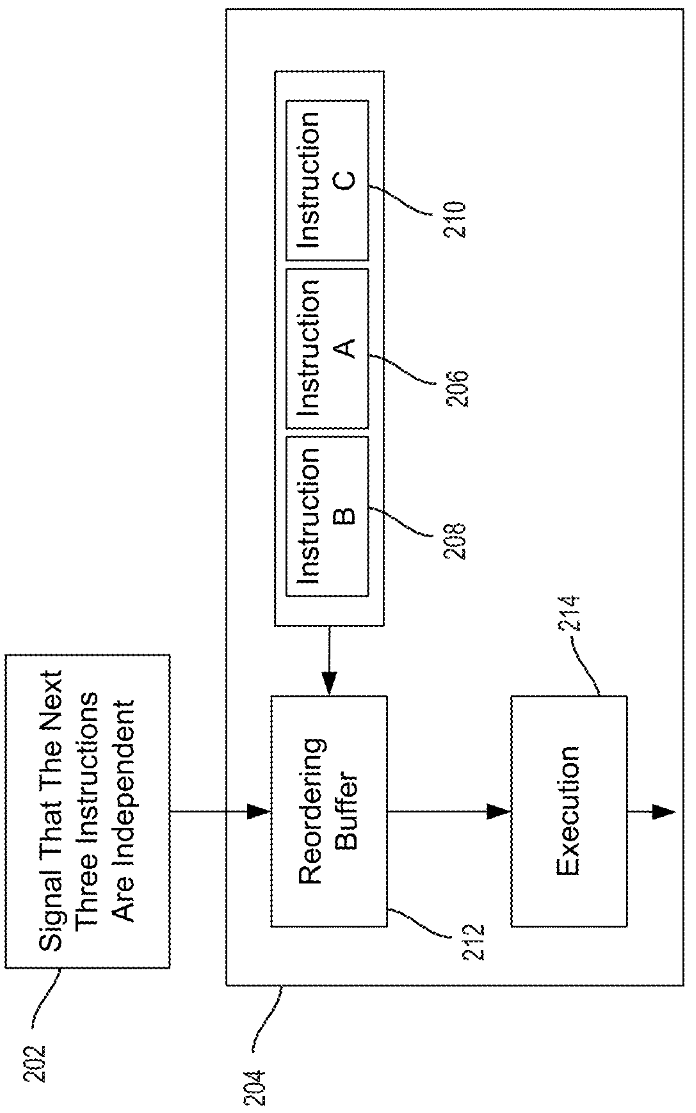
FIG. 2 is a block diagram illustrating processor instruction execution during a window for out-of-order execution, in accordance with aspects of the present disclosure.

As shown in FIG. 2, a signal 202 (e.g., indication), such as machine instruction, flag, register setting, etc., may indicate that a plurality of instructions may be executed out-of-order. During this window, a plurality of independent instructions may be received by a processor 204 to be executed, such as instructions A 206, B 208, and C 210. The processor 204 may randomly reorder the plurality of instructions and load the plurality of instructions into a reordering buffer 212 (e.g., a memory for storing instructions that have been reordered) in a random order. The processor 204 may then execute 214 the plurality of instructions in the random order. For example, the processor may apply a random permutation (e.g., randomly, or pseudo-randomly, reordering a plurality of instructions) to the execution order of the plurality of instructions, load the plurality of instructions into the reordering buffer 212 based on the random permutation of the execution order, and execute the plurality of instructions in a manner similar to performing speculative execution. The results of the executed plurality of instructions may be stored in the reordering buffer 212. In some cases, the instructions A 206, B 208, and C 210 may also be loaded into the main branch in the random order. The instructions in the main branch may then be matched to the plurality of instructions in the reordering buffer 220, and the results of the executed plurality of instructions from the reordering buffer 212 may be used (e.g., output, actually written to specified registers/memory/cache, etc.). In some cases, use of the indication that a plurality of instructions may be based on a command in a higher level programming language that may be compiled into assembly/machine instruction (e.g., machine code, opcode, etc.).

Figure 3A:
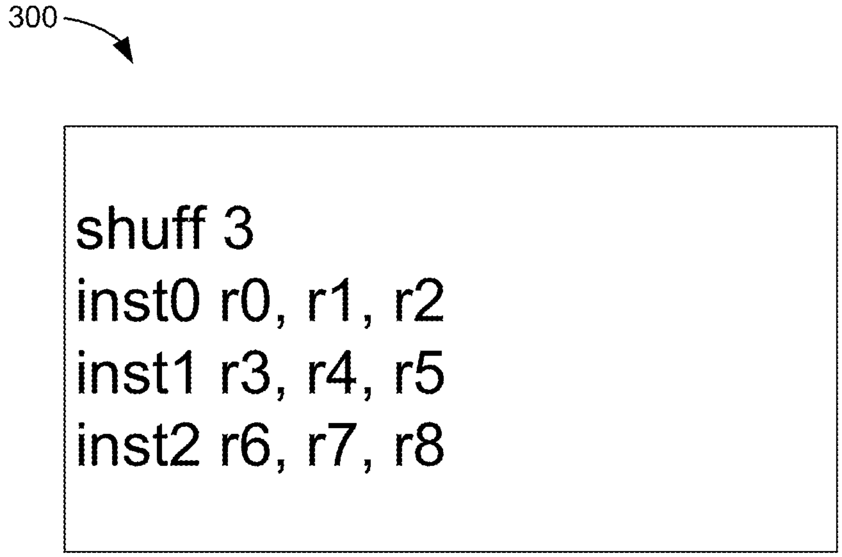
FIG. 3A is an example of assembly code illustrating a dedicated instruction indicating a plurality of independent instructions which may be executed in a random order, in accordance with aspects of the present disclosure.

FIG. 3A is an example of assembly code 300 illustrating a dedicated instruction indicating a plurality of independent instructions which may be executed in a random order, in accordance with aspects of the present disclosure. The assembly code 300 includes a dedicated instruction in the first line, "shuff," which indicates to the processor that a plurality of instructions following the shuff instruction may be executed a random order. In this example, the shuff instruction takes a parameter, here 3, which indicates a number of instructions after the shuff instruction can be executed in the random order.

Figure 3B:
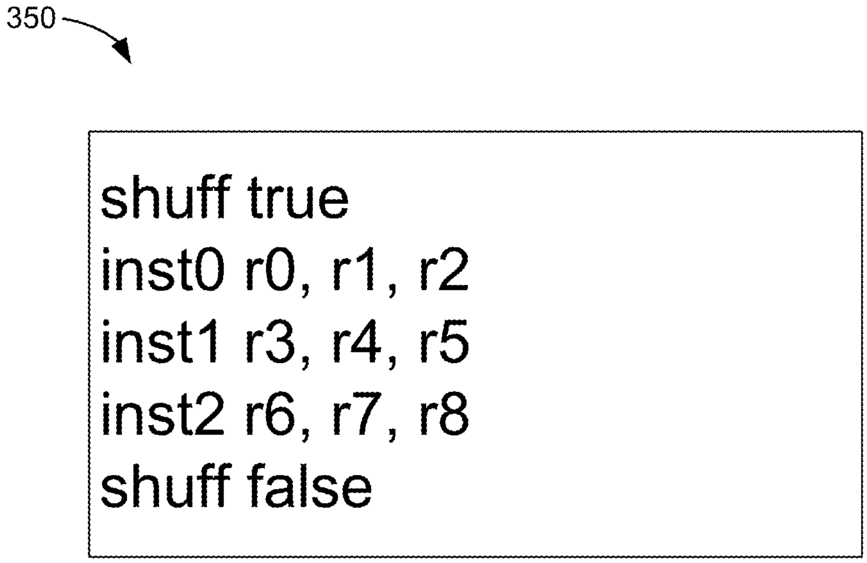
FIG. 3B is an example of assembly code illustrating dedicated instructions indicating a plurality of independent instructions which may be executed in a random order, in accordance with aspects of the present disclosure.

FIG. 3B is an example of assembly code 350 illustrating dedicated instructions indicating a plurality of independent instructions which may be executed in a random order, in accordance with aspects of the present disclosure. Similar to assembly code 300, assembly code 350 also includes the dedicated instruction "shuff" in the first line. In this example, the shuff instruction takes a binary parameter, true or false, where a true indicates that the instructions subsequent to the shuff true instruction can be executed in a random order (e.g., where the plurality of instructions that may be executed in the random order begins). The shuff false instruction may then indicate an end to the plurality of instructions that can be executed in random order. In other examples, multiple dedicated instructions may be used. For example, a first instruction may indicate that following instructions may be executed in a random order while a second instruction may indicate an end to the plurality instructions that may be executed in the random order.

In some cases, the indication for independent instructions may be provided to the processor using a mechanism other than an explicit instruction. For example, the indication of independent instructions may be based on a set flag, a voltage applied to a pin, a bit set in a register, etc. In some cases, presence of such an indication may indicate that an instruction being received may be executed independently of a next instruction. Removal of the indication of independent instructions may correspond with the last independent instruction, in a manner similar to that described above with respect to FIG. 3B.

In some cases, dummy instructions may also be included as a part of the independent instructions. The dummy instructions may be valid instructions which perform some operations, the results of which may be discarded. In some cases, the dummy instructions may be randomly inserted along with the independent instructions.

Figure 4:
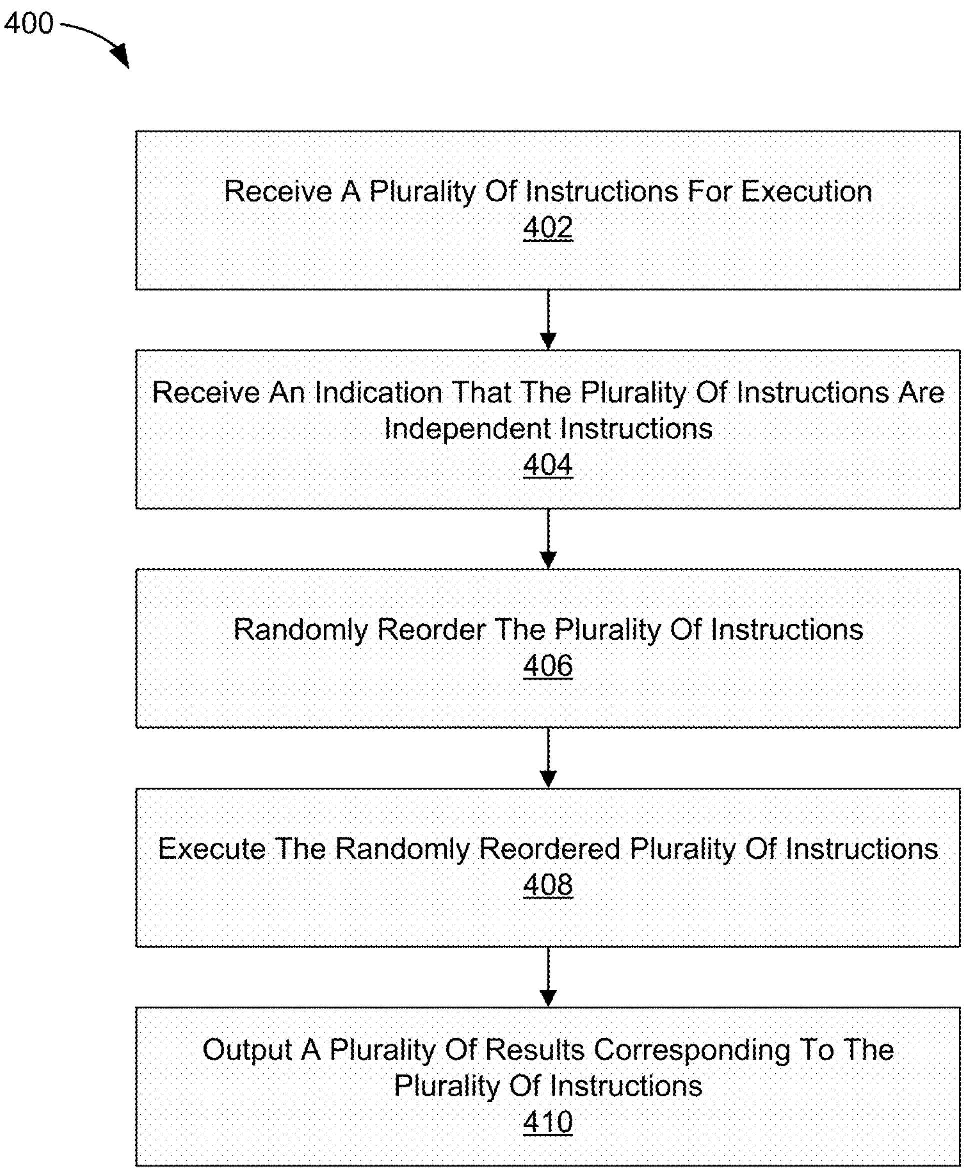
FIG. 4 is a flow diagram of a process for secure processing, in accordance with aspects of the present disclosure.

FIG. 4 is a flow diagram of a process 400 for secure processing, in accordance with aspects of the present disclosure. The process 400 may be performed by a computing device (or apparatus) or a component (e.g., a chipset, codec, processor 110 of FIG. 1, TEE 180 of FIG. 1, secure element 190 of FIG. 1, processor 204 of FIG. 2, processor 710 of FIG. 7, etc.) of the computing device. Examples of the computing device can include the wireless device 100 of FIG. 1, UE 504, the UE 552, and/or the UE 590 of FIG. 5. The computing device may be a mobile device (e.g., a mobile phone), an extended reality (XR) device such as a virtual reality (VR) device or augmented reality (AR) device, a vehicle or component or system of a vehicle, a network-connected wearable such as a watch, or other type of computing device. In another example, the process 400 may be performed by a computing device with the computing system 700 shown in FIG. 7. The operations of the process 400 may be implemented as software components that are executed and run on one or more processors. In some cases, the computing device may include an indication, such as a configuration, that the UE may use an enhanced privacy technique, such as techniques discussed in accordance with aspects of the present disclosure.

At block 402, the computing device (or component thereof) may receive a plurality of instructions (e.g., assembly code 300) for execution.

At block 404, the computing device (or component thereof) may receive an indication that the plurality of instructions are independent instructions. For example, the indication of independent instructions may be based on a dedicated instruction, a set flag, a voltage applied to a pin, a bit set in a register, etc. In some cases, the indication comprises a dedicated instruction. In some cases, the dedicated instruction indicates a number of subsequent instructions comprise the plurality of instructions for execution (see e.g., assembly code 300). In some cases, the dedicated instruction includes a parameter, the parameter indicating that a subsequent instruction is an instruction of the plurality of instructions for execution (see e.g., assembly code 350). In some cases, the parameter of the dedicated instruction indicates an end to the plurality of instructions for execution (see e.g., assembly code 350). In some cases, the indication comprises at least one of a flag, register setting, or voltage on a pin.

At block 406, the computing device (or component thereof) may randomly reorder the plurality of instructions. In some cases, the computing device (or component thereof) may randomly reorder the plurality of instructions by applying a random (or pseudo-random) permutation (e.g., randomly shuffling) to an execution order of the plurality of instructions. In some cases, the computing device (or component thereof) may randomly reorder the plurality of instructions by loading the plurality of instructions into a reordering buffer (e.g., reordering buffer 212) based on the random permutation to the execution order.

At block 408, the computing device (or component thereof) may execute the randomly reordered plurality of instructions. In some cases, the computing device (or component thereof) may execute the randomly reordered plurality of instructions loaded into the reordering buffer.

At block 410, the computing device (or component thereof) may output a plurality of results corresponding to the plurality of instructions.

As described herein, a wireless device (e.g., the wireless device 100 of FIG. 1) can communicate via one or more wireless networks. Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, etc.), an XR device (e.g., a VR headset, an AR headset or glasses, or a MR headset), a vehicle (e.g., automobile, motorcycle, bicycle, etc.), and/or IoT device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 5 illustrates an example of a wireless communications system 500 that can provide a wireless device (e.g., the wireless device 100 of FIG. 1) with network access. The wireless communications system 500 (which may also be referred to as a wireless wide area network (WWAN)) may include various base stations 502 and various UEs 504. The wireless device 100 of FIG. 1 is an example of a UE 504. In some aspects, the base stations 502 may also be referred to as "network entities" or "network nodes." One or more of the base stations 502 may be implemented in an aggregated or monolithic base station architecture. Additionally, or alternatively, one or more of the base stations 502 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 502 may include macro cell base stations (high power cellular base stations) and/or small cell base stations (low power cellular base stations). In an aspect, the macro cell base station may include eNBs and/or ng-eNBs where the wireless communications system 500 corresponds to a long term evolution (LTE) network, or gNBs where the wireless communications system 500 corresponds to a NR network, or a combination of both, and the small cell base stations may include femtocells, picocells, microcells, etc.

The base stations 502 may collectively form a RAN and interface with a core network 570 (e.g., an evolved packet core (EPC) or a 5G core (5GC)) through backhaul links 522, and through the core network 570 to one or more location servers 572 (which may be part of core network 570 or may be external to core network 570). The UEs 504 may be able to access one or more remote servers, such as a service provider server 574, via the base stations 502 and core network 570, and in some cases, the other networks, such as the Internet. In addition to other functions, the base stations 502 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 502 may communicate with each other directly or indirectly (e.g., through the EPC or 5GC) over backhaul links 534, which may be wired and/or wireless.

The base stations 502 may wirelessly communicate with the UEs 504. Each of the base stations 502 may provide communication coverage for a respective geographic coverage area 510. In an aspect, one or more cells may be supported by a base station 502 in each coverage area 510. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 510.

While neighboring macro cell base station 502 geographic coverage areas 510 may partially overlap (e.g., in a handover region), some of the geographic coverage areas 510 may be substantially overlapped by a larger geographic coverage area 510. For example, a small cell base station 502' may have a coverage area 510' that substantially overlaps with the coverage area 510 of one or more macro cell base stations 502. A network that includes both small cell and macro cell base stations may be known as a heterogeneous network. A heterogeneous network may also include home eNBs (HeNBs), which may provide service to a restricted group known as a closed subscriber group (CSG).

The communication links 520 between the base stations 502 and the UEs 504 may include uplink (also referred to as reverse link) transmissions from a UE 504 to a base station 502 and/or downlink (also referred to as forward link) transmissions from a base station 502 to a UE 504. The communication links 520 may use MIMO antenna technology, including spatial multiplexing, beamforming, and/or transmit diversity. The communication links 520 may be through one or more carrier frequencies. Allocation of carriers may be asymmetric with respect to downlink and uplink (e.g., more or less carriers may be allocated for downlink than for uplink).

The wireless communications system 500 may further include a WLAN AP 550 in communication with WLAN stations (STAs) 552 via communication links 554 in an unlicensed frequency spectrum (e.g., 5 Gigahertz (GHz)). When communicating in an unlicensed frequency spectrum, the WLAN STAs 552 and/or the WLAN AP 550 may perform a clear channel assessment (CCA) or listen before talk (LBT) procedure prior to communicating in order to determine whether the channel is available. In some examples, the wireless communications system 500 may include devices (e.g., UEs, etc.) that communicate with one or more UEs 504, base stations 502, APs 550, etc. utilizing the ultra-wideband (UWB) spectrum. The UWB spectrum may range from 3.1 to 10.5 GHz.

The small cell base station 502' may operate in a licensed and/or an unlicensed frequency spectrum. When operating in an unlicensed frequency spectrum, the small cell base station 502' may employ LTE or NR technology and use the same 5 GHz unlicensed frequency spectrum as used by the WLAN AP 550. The small cell base station 502', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 500 may further include a millimeter wave (mmW) base station 580 that may operate in mmW frequencies and/or near mmW frequencies in communication with a UE 582. The mmW base station 580 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 580 and the UE 582 may utilize beamforming (transmit and/or receive) over an mmW communication link 584 to compensate for the extremely high path loss and short range. Further, it will be appreciated that in alternative configurations, one or more base stations 502 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 502/580, UEs 504/582) operate is divided into multiple frequency ranges, FR1 (from 450 to 6000 Megahertz (MHZ)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 504/582 and the cell in which the UE 504/582 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 504 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 504/582 in a cell may have different downlink primary carriers. The same is true for the uplink primary carriers. The network is able to change the primary carrier of any UE 504/582 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 5, one of the frequencies utilized by the macro cell base stations 502 may be an anchor carrier (or "PCell") and other frequencies utilized by the macro cell base stations 502 and/or the mmW base station 580 may be secondary carriers ("SCells"). In carrier aggregation, the base stations 502 and/or the UEs 504 may use spectrum up to Y MHz (e.g., 5, 10, 15, 20, 100 MHZ) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 504/582 to significantly increase its data transmission and/or reception rates. For example, two 20 MHZ aggregated carriers in a multi-carrier system would theoretically lead to a two-fold increase in data rate (i.e., 40 MHZ), compared to that attained by a single 20 MHz carrier.

In order to operate on multiple carrier frequencies, a base station 502 and/or a UE 504 may be equipped with multiple receivers and/or transmitters. For example, a UE 504 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 504 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 504 is being served in band 'X' or band 'Y,' because of the separate "Receiver 2," the UE 504 may measure band 'Z' without interrupting the service on band 'X' or band 'Y.'

The wireless communications system 500 may further include a UE 564 that may communicate with a macro cell base station 502 over a communication link 520 and/or the mmW base station 580 over an mmW communication link 584. For example, the macro cell base station 502 may support a PCell and one or more SCells for the UE 564 and the mmW base station 580 may support one or more SCells for the UE 564.

The wireless communications system 500 may further include one or more UEs, such as UE 590, that connects indirectly to one or more communication networks via one or more device-to-device (D2D) peer-to-peer (P2P) links (referred to as "sidelinks"). In the example of FIG. 5, UE 590 has a D2D P2P link 592 with one of the UEs 504 connected to one of the base stations 502 (e.g., through which UE 590 may indirectly obtain cellular connectivity) and a D2D P2P link 594 with WLAN STA 552 connected to the WLAN AP 550 (through which UE 590 may indirectly obtain WLAN-based Internet connectivity). In an example, the D2D P2P links 592 and 594 may be supported with any well-known D2D RAT, such as LTE Direct (LTE-D), Wi-Fi Direct (Wi-Fi-D), Bluetooth®, and so on.

Figure 6:
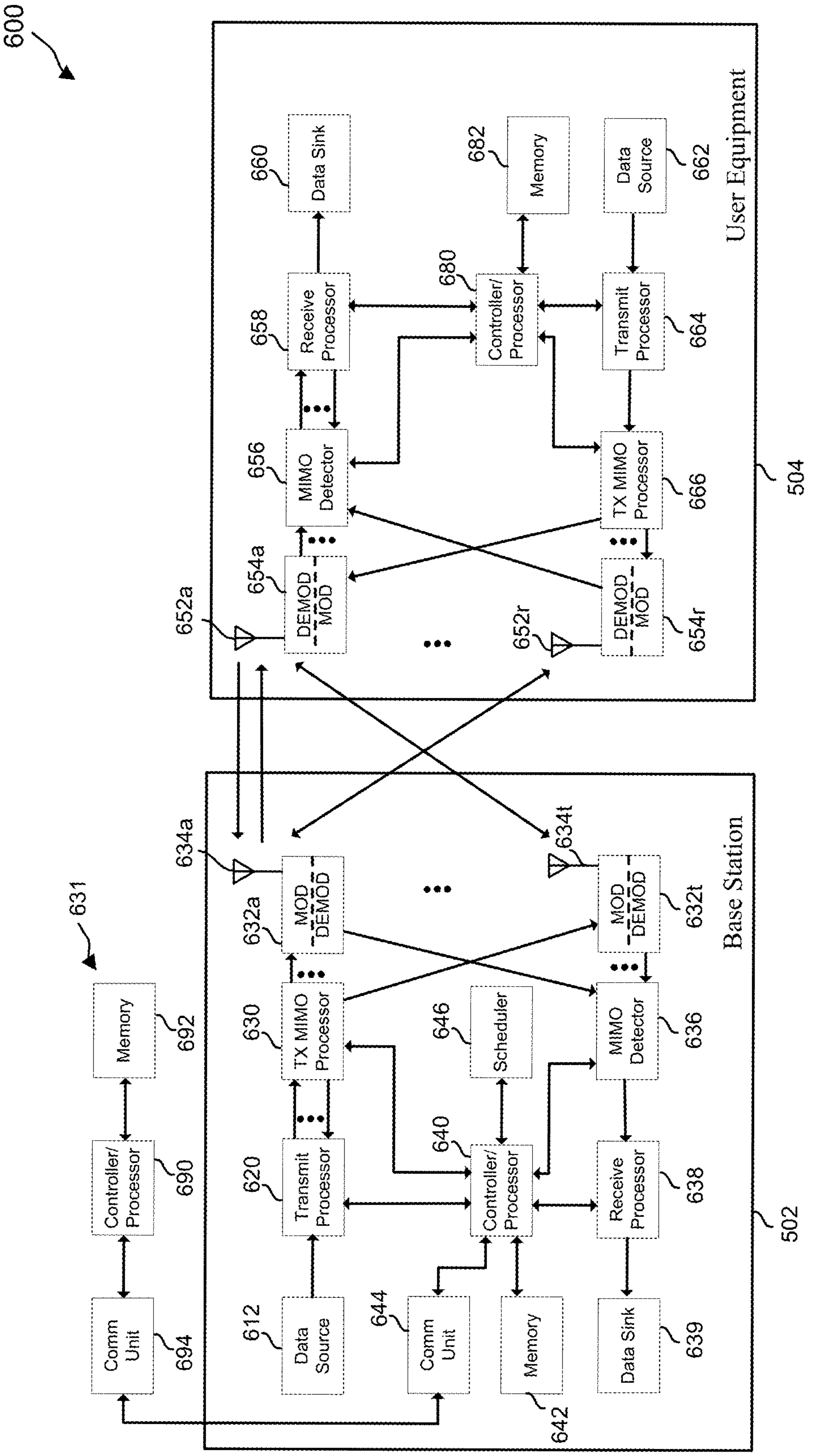
FIG. 6 is a diagram illustrating a design of a base station and a User Equipment (UE) device that enable transmission and processing of signals exchanged between the UE and the base station, in accordance with some examples.

FIG. 6 shows a block diagram of a design of a base station 506 and a UE 504 that enable transmission and processing of signals exchanged between the UE and the base station, in accordance with some aspects of the present disclosure. Design 600 includes components of a base station 502 and a UE 504, which may be one of the base stations 502 and one of the UEs 504 in FIG. 5. Base station 502 may be equipped with T antennas 634*a* through 634*t*, and UE 504 may be equipped with R antennas 652*a* through 652*r*, where in general T≥1 and R≥1.

At base station 502, a transmit processor 620 may receive data from a data source 612 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 620 may also process system information (e.g., for semi-static resource partitioning information (SRPI) and/or the like) and control information (e.g., CQI requests, grants, upper layer signaling, and/or the like) and provide overhead symbols and control symbols. Transmit processor 620 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 630 may perform spatial processing (e.g., precoding) on the data symbols, the control symbols, the overhead symbols, and/or the reference symbols, if applicable, and may provide T output symbol streams to T modulators (MODs) 632*a* through 632*t*. The modulators 632*a* through 632*t* are shown as a combined modulator-demodulator (MOD-DEMOD). In some cases, the modulators and demodulators may be separate components. Each modulator of the modulators 632*a* to 632*t* may process a respective output symbol stream, e.g., for an orthogonal frequency-division multiplexing (OFDM) scheme and/or the like, to obtain an output sample stream. Each modulator of the modulators 632*a* to 632*t* may further process (e.g., convert to analog, amplify, filter, and upconvert) the output sample stream to obtain a downlink signal. T downlink signals may be transmitted from modulators 632*a* to 632*t* via T antennas 634*a* through 634*t*, respectively. According to certain aspects described in more detail below, the synchronization signals may be generated with location encoding to convey additional information.

At UE 504, antennas 652*a* through 652*r* may receive the downlink signals from base station 502 and/or other base stations and may provide received signals to demodulators (DEMODs) 654*a* through 654*r*, respectively. The demodulators 654*a* through 654*r* are shown as a combined modulator-demodulator (MOD-DEMOD). In some cases, the modulators and demodulators may be separate components. Each demodulator of the demodulators 654*a* through 654*r* may condition (e.g., filter, amplify, downconvert, and digitize) a received signal to obtain input samples. Each demodulator of the demodulators 654*a* through 654*r* may further process the input samples (e.g., for OFDM and/or the like) to obtain received symbols. A MIMO detector 656 may obtain received symbols from all R demodulators 654*a* through 654*r*, perform MIMO detection on the received symbols if applicable, and provide detected symbols. A receive processor 658 may process (e.g., demodulate and decode) the detected symbols, provide decoded data for UE 504 to a data sink 660, and provide decoded control information and system information to a controller/processor 680. A channel processor may determine reference signal received power (RSRP), received signal strength indicator (RSSI), reference signal received quality (RSRQ), channel quality indicator (CQI), and/or the like.

On the uplink, at UE 504, a transmit processor 664 may receive and process data from a data source 662 and control information (e.g., for reports comprising RSRP, RSSI, RSRQ, CQI, and/or the like) from controller/processor 680. Transmit processor 664 may also generate reference symbols for one or more reference signals (e.g., based at least in part on a beta value or a set of beta values associated with the one or more reference signals). The symbols from transmit processor 664 may be precoded by a TX-MIMO processor 666 if applicable, further processed by modulators 654*a* through 654*r* (e.g., for DFT-s-OFDM, CP-OFDM, and/or the like), and transmitted to base station 502. At base station 502, the uplink signals from UE 504 and other UEs may be received by antennas 634*a* through 634*t*, processed by demodulators 632*a* through 632*t*, detected by a MIMO detector 636 if applicable, and further processed by a receive processor 638 to obtain decoded data and control information sent by UE 504. Receive processor 638 may provide the decoded data to a data sink 639 and the decoded control information to controller (processor) 640. Base station 502 may include communication unit 644 and communicate to a network controller 631 via communication unit 644. Network controller 631 may include communication unit 694, controller/processor 690, and memory 692.

In some aspects, one or more components of UE 504 may be included in a housing. Controller 640 of base station 502, controller/processor 680 of UE 504, and/or any other component(s) of FIG. 6 may perform one or more techniques associated with implicit UCI beta value determination for NR.

Memories 642 and 682 may store data and program codes for the base station 502 and the UE 504, respectively. A scheduler 646 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 7:
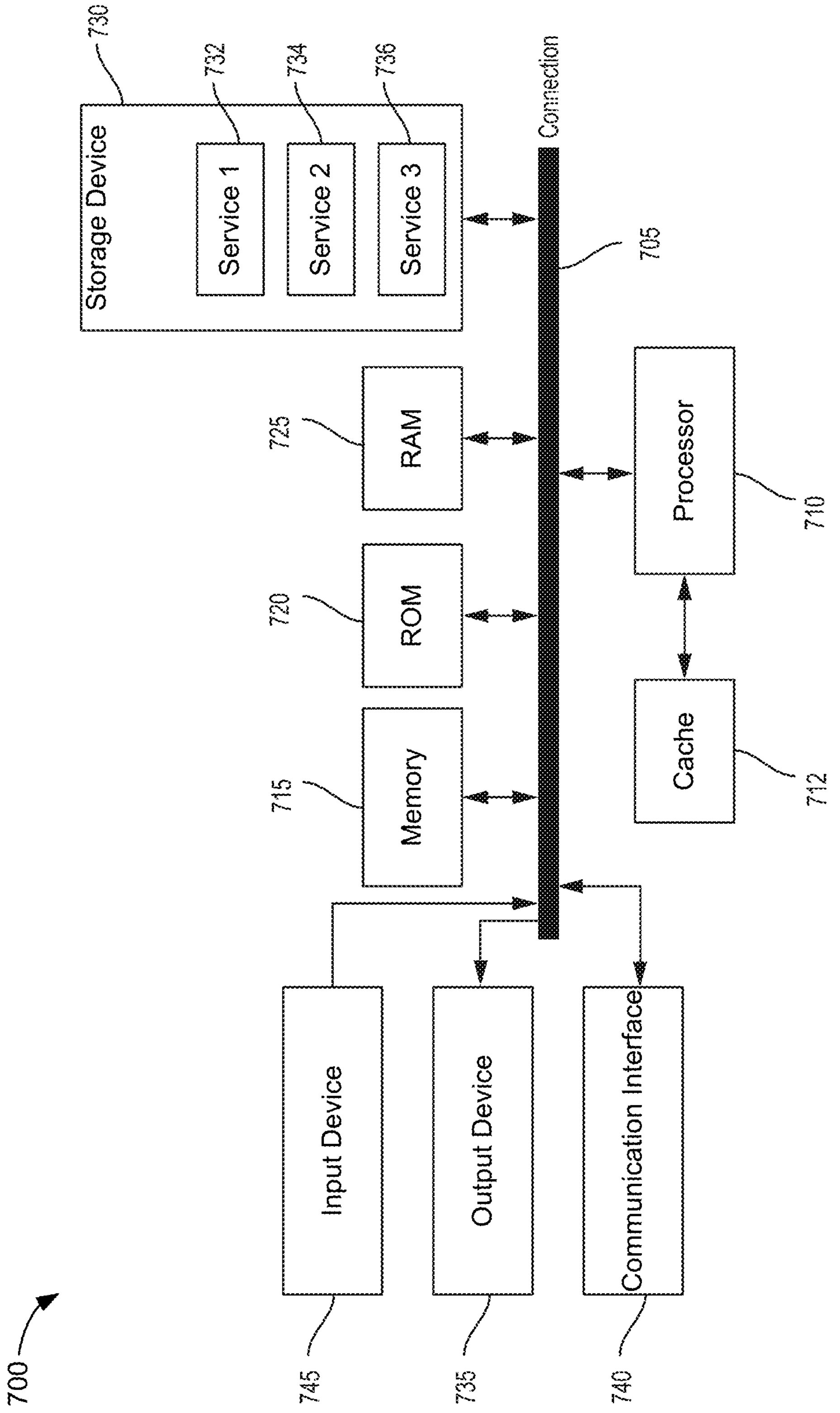
FIG. 7 is a diagram illustrating an example of a computing system, according to aspects of the disclosure.

FIG. 7 is a diagram illustrating an example of a system for implementing certain aspects of the present technology. In particular, FIG. 7 illustrates an example of computing system 700, which may be for example any computing device making up internal computing system, a remote computing system, a camera, or any component thereof in which the components of the system are in communication with each other using connection 705. Connection 705 may be a physical connection using a bus, or a signal connection into processor 710, such as in a chipset architecture. Connection 705 may also be a virtual connection, networked connection, or logical connection.

In some embodiments, computing system 700 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 700 includes at least one processing unit (CPU or processor) 710 and connection 705 that communicatively couples various system components including system memory 715, such as read-only memory (ROM) 720 and random access memory (RAM) 725 to processor 710. Computing system 700 may include a cache 712 of high-speed memory connected directly with, in close proximity to, or integrated as part of processor 710.

Processor 710 may include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms. In some instances, multimodal systems may enable a user to provide multiple types of input/output to communicate with computing system 700.

Computing system 700 may include communications interface 740, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be one or more non-volatile and/or non-transitory and/or computer-readable memory devices and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 730 may include software services, servers, services, etc., that when the code that defines such software is executed by the processor 710, it causes the system to perform a function. In some embodiments, a hardware service that performs a particular function may include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive.

For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per sc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 615, read-only memory (ROM) 620, random access memory (RAM) 625, storage device 630, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for secure processing, comprising: a memory comprising instructions; and a processor coupled to the memory, wherein the processor is configured to: receive a plurality of instructions for execution; receive an indication that the plurality of instructions are independent instructions; randomly reorder the plurality of instructions; execute the randomly reordered plurality of instructions; and output a plurality of results corresponding to the plurality of instructions.

Aspect 2. The apparatus of Aspect 1, wherein the indication comprises a dedicated instruction.

Aspect 3. The apparatus of Aspect 2, wherein the dedicated instruction indicates a number of subsequent instructions comprise the plurality of instructions for execution.

Aspect 4. The apparatus of any one of Aspects 2 or 3, wherein the dedicated instruction includes a parameter, the parameter indicating that a subsequent instruction is an instruction of the plurality of instructions for execution.

Aspect 5. The apparatus of Aspect 4, wherein the parameter of the dedicated instruction indicates an end to the plurality of instructions for execution.

Aspect 6. The apparatus of any one of Aspects 1 to 5, wherein the indication comprises at least one of a flag, register setting, or voltage on a pin.

Aspect 7. The apparatus of any one of Aspects 1 to 6, wherein, to randomly reorder the plurality of instructions, the processor is configured to apply a random permutation to an execution order of the plurality of instructions.

Aspect 8. The apparatus of Aspect 7, further comprising a reordering buffer, and wherein, to randomly reorder the plurality of instructions, the processor is further configured to load the plurality of instructions into the reordering buffer based on the random permutation to the execution order.

Aspect 9. The apparatus of Aspect 8, wherein, to execute the randomly reordered plurality of instructions, the processor is further configured to execute the randomly reordered plurality of instructions loaded into the reordering buffer.

Aspect 10. A method for secure processing, comprising: receiving a plurality of instructions for execution; receiving an indication that the plurality of instructions are independent instructions; randomly reordering the plurality of instructions; executing the randomly reordered plurality of instructions; and outputting a plurality of results corresponding to the plurality of instructions.

Aspect 11. The method of Aspect 10, wherein the indication comprises a dedicated instruction.

Aspect 12. The method of Aspect 11, wherein the dedicated instruction indicates a number of subsequent instructions comprise the plurality of instructions for execution.

Aspect 13. The method of any one of Aspects 11 or 12, wherein the dedicated instruction includes a parameter, the parameter indicating that a subsequent instruction is an instruction of the plurality of instructions for execution.

Aspect 14. The method of Aspect 13, wherein the parameter of the dedicated instruction indicates an end to the plurality of instructions for execution.

Aspect 15. The method of any one of Aspects 10 to 14, wherein the indication comprises at least one of a flag, register setting, or voltage on a pin.

Aspect 16. The method of any one of Aspects 10 to 15, wherein randomly reordering the plurality of instructions comprises applying a random permutation to an execution order of the plurality of instructions.

Aspect 17. The method of Aspect 16, wherein randomly reordering the plurality of instructions comprises loading the plurality of instructions into a reordering buffer based on the random permutation to the execution order.

Aspect 18. The method of Aspect 17, wherein executing the randomly reordered plurality of instructions comprises executing the randomly reordered plurality of instructions loaded into the reordering buffer.

Aspect 19. An apparatus for secure processing, comprising: means for receiving a plurality of instructions for execution; means for receiving an indication that the plurality of instructions are independent instructions; means for randomly reordering the plurality of instructions; means for executing the randomly reordered plurality of instructions; and means for outputting a plurality of results corresponding to the plurality of instructions.

Aspect 20. The apparatus of Aspect 19, wherein the indication comprises a dedicated instruction.

Aspect 21. The apparatus of Aspect 20, wherein the dedicated instruction indicates a number of subsequent instructions comprise the plurality of instructions for execution.

Aspect 22. The apparatus of any one of Aspects 20 or 21, wherein the dedicated instruction includes a parameter, the parameter indicating that a subsequent instruction is an instruction of the plurality of instructions for execution.

Aspect 23. The apparatus of Aspect 22, wherein the parameter of the dedicated instruction indicates an end to the plurality of instructions for execution.

Aspect 24. The apparatus of any one of Aspects 19 to 23, wherein the indication comprises at least one of a flag, register setting, or voltage on a pin.

Aspect 25. The apparatus of any one of Aspects 19 to 24, wherein randomly reordering the plurality of instructions comprises applying a random permutation to an execution order of the plurality of instructions.

Aspect 26. The apparatus of Aspect 25, wherein randomly reordering the plurality of instructions comprises loading the plurality of instructions into a reordering buffer based on the random permutation to the execution order.

Aspect 27. The apparatus of Aspect 26, wherein executing the randomly reordered plurality of instructions comprises executing the randomly reordered plurality of instructions loaded into the reordering buffer.

Aspect 28. A non-transitory computer-readable medium having stored thereon instructions that, when executed by one or more processors, cause the one or more processors to perform operations according to any of Aspects 10 to 18.

What is claimed is:

1. An apparatus for secure processing, comprising:
- a memory comprising instructions; and
- a processor coupled to the memory, wherein the processor is configured to:
  - receive a plurality of instructions for execution;
  - receive an indication that the plurality of instructions are executable out-of-order during an execution window;
  - randomly reorder an execution order of the plurality of instructions into a random order for execution during the execution window;
  - execute the plurality of instructions using the processor in the random order based on the randomly reordered execution order during the execution window; and
  - output a plurality of results corresponding to the plurality of instructions.

2. The apparatus of claim 1, wherein the indication comprises a dedicated instruction.

3. The apparatus of claim 2, wherein the dedicated instruction indicates a number of subsequent instructions comprise the plurality of instructions for execution.

4. The apparatus of claim 2, wherein the dedicated instruction includes a parameter, the parameter indicating that a subsequent instruction is an instruction of the plurality of instructions for execution.

5. The apparatus of claim 4, wherein the parameter of the dedicated instruction indicates an end to the plurality of instructions for execution.

6. The apparatus of claim 1, wherein the indication comprises at least one of a flag, register setting, or voltage on a pin.

7. The apparatus of claim 1, wherein, to randomly reorder the execution order of the plurality of instructions, the processor is configured to apply a random permutation to the execution order of the plurality of instructions.

8. The apparatus of claim 7, further comprising a reordering buffer, and wherein, to randomly reorder the execution order of the plurality of instructions, the processor is further configured to load the plurality of instructions into the reordering buffer based on the random permutation to the execution order.

9. The apparatus of claim 8, wherein, to execute the plurality of instructions in the random order, the processor is further configured to execute the plurality of instructions loaded into the reordering buffer in the random order.

10. A method for secure processing, comprising:

receiving a plurality of instructions for execution;

receiving an indication that the plurality of instructions are executable out-of-order during an execution window;

randomly reordering an execution order of the plurality of instructions into a random order for execution during the execution window;

executing the plurality of instructions using a processor in the random order based on the randomly reordered execution order during the execution window; and outputting a plurality of results corresponding to the plurality of instructions.

11. The method of claim 10, wherein the indication comprises a dedicated instruction.

12. The method of claim 11, wherein the dedicated instruction indicates a number of subsequent instructions comprise the plurality of instructions for execution.

13. The method of claim 11, wherein the dedicated instruction includes a parameter, the parameter indicating that a subsequent instruction is an instruction of the plurality of instructions for execution.

14. The method of claim 13, wherein the parameter of the dedicated instruction indicates an end to the plurality of instructions for execution.

15. The method of claim 10, wherein the indication comprises at least one of a flag, register setting, or voltage on a pin.

16. The method of claim 10, wherein randomly reordering the execution order of the plurality of instructions comprises applying a random permutation to the execution order of the plurality of instructions.

17. The method of claim 16, wherein randomly reordering the execution order of the plurality of instructions comprises loading the plurality of instructions into a reordering buffer based on the random permutation to the execution order.

18. The method of claim 17, wherein executing the plurality of instructions in the random order comprises executing the plurality of instructions loaded into the reordering buffer in the random order.

19. An apparatus for secure processing, comprising:

means for receiving a plurality of instructions for execution;

means for receiving an indication that the plurality of instructions are executable out-of-order during an execution window;

means for randomly reordering an execution order of the plurality of instructions into a random order for execution during the execution window;

means for executing the plurality of instructions using a processor in the random order based on the randomly reordered execution order during the execution window; and means for outputting a plurality of results corresponding to the plurality of instructions.

20. The apparatus of claim 19, wherein the indication comprises a dedicated instruction.

21. The apparatus of claim 20, wherein the dedicated instruction indicates a number of subsequent instructions comprise the plurality of instructions for execution.

22. The apparatus of claim 20, wherein the dedicated instruction includes a parameter, the parameter indicating that a subsequent instruction is an instruction of the plurality of instructions for execution.

23. The apparatus of claim 22, wherein the parameter of the dedicated instruction indicates an end to the plurality of instructions for execution.

24. The apparatus of claim 19, wherein the indication comprises at least one of a flag, register setting, or voltage on a pin.

25. The apparatus of claim 19, wherein randomly reordering the execution order of the plurality of instructions comprises applying a random permutation to an execution order of the plurality of instructions.

26. The apparatus of claim 25, wherein randomly reordering the execution order of the plurality of instructions comprises loading the plurality of instructions into a reordering buffer based on the random permutation to the execution order.

27. The apparatus of claim 26, wherein executing the plurality of instructions in the random order comprises executing the plurality of instructions loaded into the reordering buffer in the random order.

* * * * *